(12) United States Patent
Ruhland et al.

(10) Patent No.: US 10,159,923 B2
(45) Date of Patent: Dec. 25, 2018

(54) HOLLOW FILTER ELEMENT, GRIP DEVICE OF A HOLLOW FILTER ELEMENT, AND FILTER DEVICE WITH AT LEAST ONE HOLLOW FILTER ELEMENT

(71) Applicant: Mann+Hummel GMBH, Ludwigsburg (DE)

(72) Inventors: Klaus-Dieter Ruhland, Meckenheim (DE); Michael Kaufmann, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 372 days.

(21) Appl. No.: 15/007,668

(22) Filed: Jan. 27, 2016

(65) Prior Publication Data

US 2016/0220935 A1 Aug. 4, 2016

(30) Foreign Application Priority Data

Jan. 30, 2015 (DE) ........................ 10 2015 001 100

(51) Int. Cl.
  *B01D 46/00* (2006.01)
  *B01D 46/24* (2006.01)
  *B01D 46/52* (2006.01)
  *B01D 46/42* (2006.01)

(52) U.S. Cl.
  CPC ..... *B01D 46/0005* (2013.01); *B01D 46/2414* (2013.01); *B01D 46/4227* (2013.01); *B01D 46/521* (2013.01)

(58) Field of Classification Search
  CPC ............ B01D 46/2411; B01D 46/2414; B01D 46/4227; B01D 46/0005; B01D 46/521
  See application file for complete search history.

(56) References Cited

U.S. PATENT DOCUMENTS

| | | | |
|---|---|---|---|
| 2,731,155 A | 1/1956 | James | |
| 5,487,767 A * | 1/1996 | Brown | B01D 46/0024 55/357 |
| 5,601,717 A | 2/1997 | Villette et al. | |
| 7,344,577 B2 | 3/2008 | Berkhoel | |
| 2004/0261383 A1 | 12/2004 | Schaerlund et al. | |

FOREIGN PATENT DOCUMENTS

DE 7005799 U 7/1970

* cited by examiner

*Primary Examiner* — Robert Clemente
(74) *Attorney, Agent, or Firm* — James Hasselbeck

(57) ABSTRACT

A hollow filter element of a filter device for filtering air is arranged exchangeably in a filter housing of the filter device so that at least one air inlet of the filter housing for air to be filtered is separated from at least one air outlet of the filter housing for filtered air. The hollow filter element is provided with at least one filter bellows made of at least one filter medium surrounding at least one element interior circumferentially relative to an element axis of the hollow filter element. At least one grip device is arranged at an end face of the at least one filter bellows that is not provided for passage of air in operation of the hollow filter element. The hollow filter element can be gripped by the at least one grip device at least for installation into or removal from the filter housing.

13 Claims, 5 Drawing Sheets

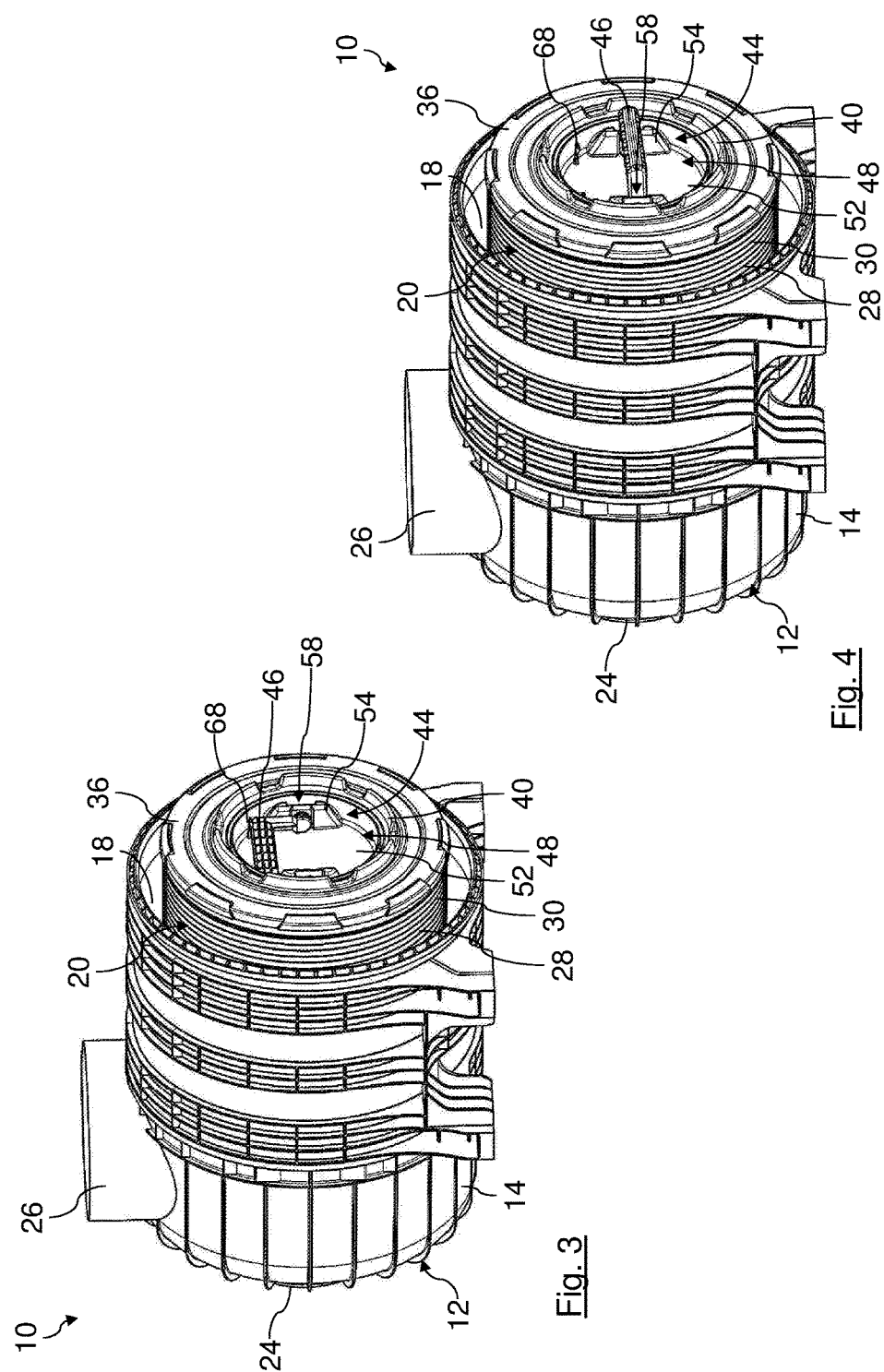

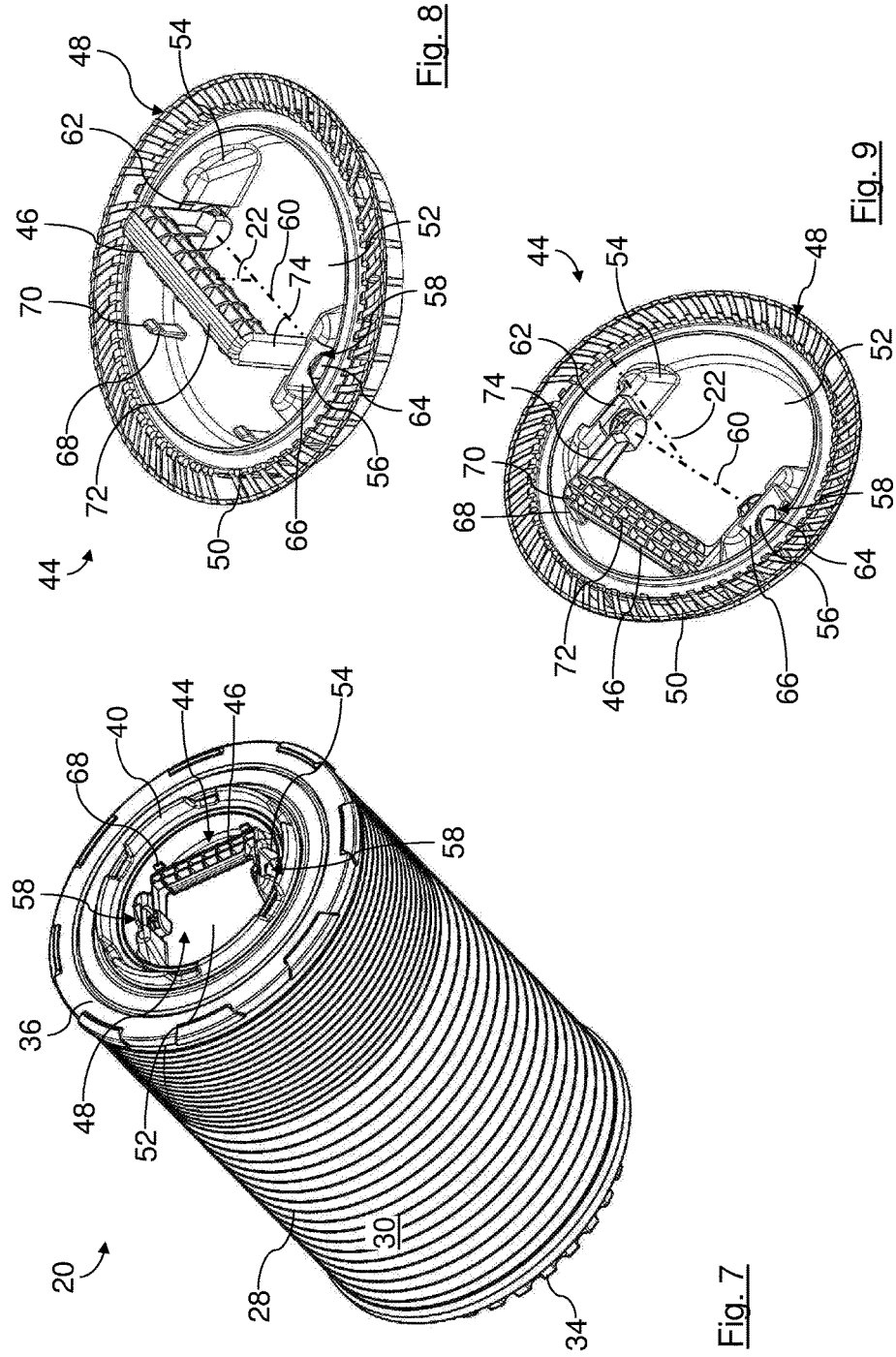

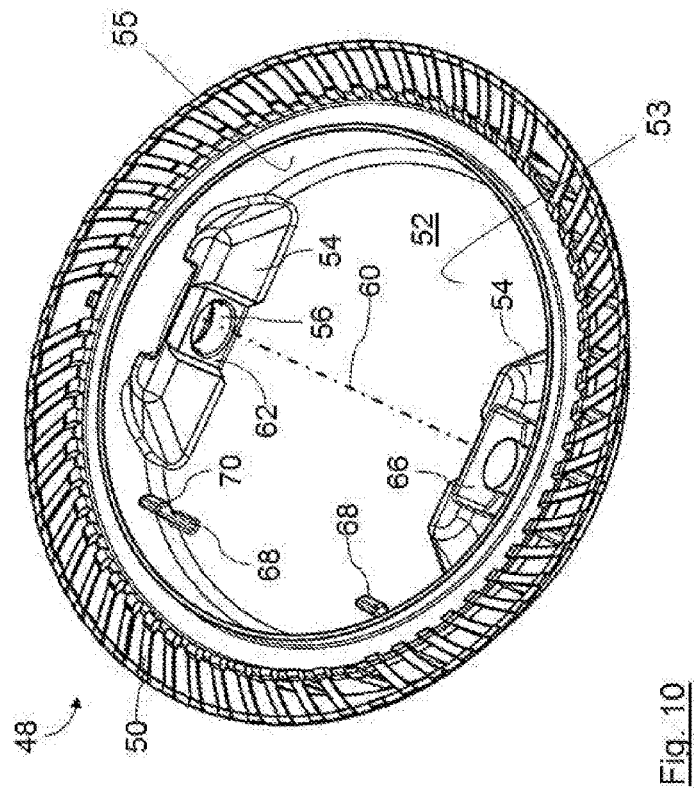
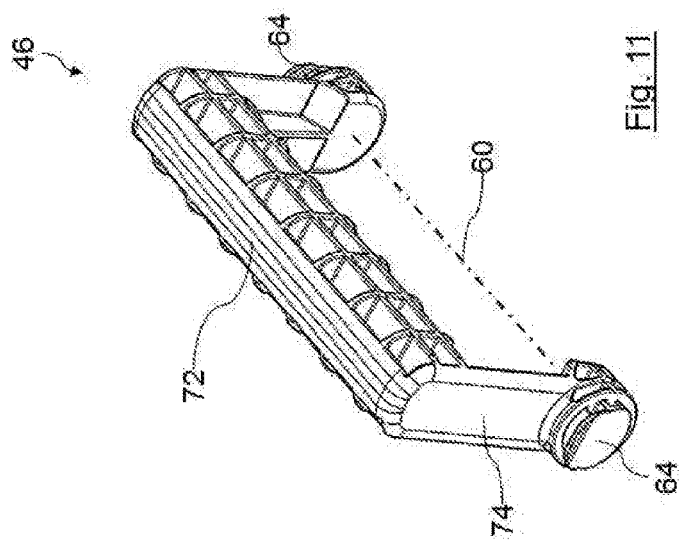
Fig. 10
Fig. 11

HOLLOW FILTER ELEMENT, GRIP DEVICE OF A HOLLOW FILTER ELEMENT, AND FILTER DEVICE WITH AT LEAST ONE HOLLOW FILTER ELEMENT

BACKGROUND OF THE INVENTION

EP 1 769 835 B1 discloses a filter element with an outer sleeve that is made of a flexible permeable material and includes an open top end and a bottom end. An inner sleeve that is arranged substantially concentric relative to the outer sleeve includes a closed top end and a bottom end. The inner sleeve is made of a flexible permeable material. The top end of the inner sleeve is separate from the top end of the outer sleeve. Attachment means are provided for attachment of the bottom end of the inner sleeve to the bottom end of the outer sleeve. Removal means are provided for carrying out the removal of the filter element from an associated filter housing. The removal means include at least one handle that is attached to the inner sleeve but not directly to the outer sleeve. A sealing collar includes two handles. The sealing collar is attached to the outer sleeve but not directly to the inner sleeve.

SUMMARY OF THE INVENTION

This object is solved according to the invention in that the at least one grip device is arranged on an end face of the hollow filter element that is not provided for passage of air in operation of the hollow filter element.

The invention has the object to design a hollow filter element, a grip device, and a filter device of the aforementioned kind in such a way that the grip device is arranged in a way as space-saving as possible on the hollow filter element without it negatively affecting an airflow with respect to the functionality of the hollow filter element in operation of the filter device.

The invention concerns a hollow filter element of a filter device for filtration of air, in particular of an internal combustion engine, in particular of a motor vehicle and/or of a construction and/or agricultural machine, including at least one filter bellows which includes at least one filter medium that surrounds at least one element interior circumferentially relative to an element axis and that is connected, in particular seal-tightly, at least at one end face with at least one end member, wherein the hollow filter element can be arranged, in particular exchangeably, in a filter housing of the filter device such that it separates at least one air inlet of the filter housing for air to be filtered from at least one air outlet for filtered air, wherein on at least one end face of the at least one filter bellows at least one grip device is arranged by which the hollow filter element can be gripped at least for installation into or removal from the filter housing.

Moreover, the invention concerns a grip device of a hollow filter element, in particular of a hollow filter element according to the invention, of a filter device for filtration of air, in particular of an internal combustion engine, in particular of a motor vehicle and/or of a construction and/or agricultural machine, which can be arranged on at least one end face of a filter bellows of the hollow filter element and by which the hollow filter element can be gripped at least for installation into or removal from a filter housing, wherein the filter bellows includes at least one filter medium that surrounds at least one element interior circumferentially relative to an element axis, and the filter bellows is connected, in particular seal-tightly, at least at one end face with at least one end member, and wherein the hollow filter element can be arranged, in particular exchangeably, in a filter housing of the filter device in such a way that it separates at least one air inlet of the filter housing for air to be filtered from at least one air outlet for filtered air.

Moreover, the invention concerns a filter device with at least one hollow filter element for filtration of air, in particular of an internal combustion engine, in particular of a motor vehicle and/or of a construction and/or agricultural machine, wherein the at least one hollow filter element includes at least one filter bellows which includes at least one filter medium that surrounds at least one element interior circumferentially relative to an element axis, and the filter bellows is connected, in particular seal-tightly, at least at one end face with at least one end member, wherein the at least one hollow filter element is arranged, in particular exchangeably, in a filter housing of the filter device in such a way that it separates at least one air inlet of the filter housing for air to be filtered from at least one air outlet for filtered air, wherein on at least one end face of the at least one filter bellows at least one grip device is arranged by which the hollow filter element can be gripped at least for installation into or removal from the filter housing. According to the invention, the at least one grip device is arranged in an area that is not flowed through by air in operation or is arranged in such a way on the hollow filter element that, for improving the functionality, it positively affects volitionally, preferably prevents, passage of air at the corresponding end face. In this way, the at least one grip device has at least no negative effect with respect to the airflow in the context of functionality of the hollow filter element.

The at least one grip device can be arranged outside of the airflow such that it does not affect the desired airflow, in particular does not disturb it. Alternatively, the at least one grip device can be arranged such that it volitionally guides, limits or prevents the airflow and thereby even positively affects the airflow in the context of the functionality of the hollow filter element.

Advantageously, the element interior can be at least partially closed at the end face where the at least one grip device is arranged.

At the end face, the at least one grip device can moreover be arranged in a space-saving way. At the end face, the hollow filter element can be gripped by means of the at least one grip device easily by hand and/or by means of a gripping tool. The hollow filter element can be gripped by means of the at least one grip device, in particular can be inserted axially relative to the element axis into the filter housing and can be pulled out of it. Moreover, the hollow filter element can be carried easily by means of the grip device. In this way, in particular heavy and/or large hollow filter elements can be manipulated or handled more easily.

Advantageously, at least partially, the at least one grip device can include, or be made of, plastic material and/or metal and/or another type of material, in particular a carbon fiber compound. Plastic material can be shaped easily, in particular injection molded or cast. Metal can be configured easily, in particular be rolled, stamped, cut, folded, crimped and/or bent. The at least one grip device can also include a material mixture, in particular a combination of metal and plastic material.

Advantageously, the at least one grip device can be at least partially rigid, in particular non-flexible. In this way, mechanical forces can be transmitted better. Alternatively or additionally, the at least one grip device can be at least partially flexible, in particular elastic. In this way, tolerances can be compensated better and/or operationally caused vibrations can be compensated. Also, in this way a grip device including several components can be assembled more easily.

A hollow filter element is characterized in that it includes at least one element interior which is surrounded by a filter bellows with filter medium. The filter medium can be flowed through by the air to be purified from the exterior to the interior toward the element interior or in opposite direction. The element interior includes an air aperture to the exterior through which, depending on the flow direction, the purified air can exit from the element interior or the air to be purified can flow into it.

The hollow filter element can be advantageously a round filter element with a round cross-section; an oval round filter element with an oval cross-section; a flat oval round filter element with a flattened oval cross-section; a conical round filter element having a round cross-section that tapers in axial direction relative to a major axis; a conical oval round filter element having an oval cross-section that tapers in axial direction at least in the direction of a transverse axis; a conical flat oval round filter element having a flat oval cross-section that tapers in axial direction at least in the direction of a transverse axis; or a hollow filter element with a different, in particular an angular, cross-section and/or a different axial cross-section course in the direction of the element axis.

With the at least one grip device, even larger hollow filter elements with diameters of up to 40 cm and more can be gripped and handled easily and reliably. Such hollow filter elements can have a mass of up to 30 kg and more when laden with dirt.

The filter medium can advantageously be closed or open in circumferential direction relative to the element axis. The filter element can be in particular folded or bent in a star shape, preferably zigzag-shaped or wave-shape. However, the filter medium can also be not folded or not bent.

The filter medium can be filter paper, filter nonwoven, filter foam or a different type of filter medium that is suitable for filtration of air, or a combination of various filter media. The filter medium can be a single layer or a multi-layer configuration. The filter medium can be embodied as the filter bellows.

The filter device, in particular the hollow filter element, can advantageously be part of an air intake manifold of an internal combustion engine. The filter device, in particular the hollow filter element, can serve for purifying combustion air which is supplied to the internal combustion engine for combustion. The invention is however not limited to an air filter of an air intake manifold of an internal combustion engine of a motor vehicle. Rather, it can also be used in connection with other types of air systems of motor vehicles. The filter device can also be used outside of the automotive technology, in particular in industrial motors. A filter device according to the invention, in particular a hollow filter element according to the invention, can also be used in commercial vehicles, in particular buses, tractors, trucks or excavators, or agricultural/construction machines or the like.

In an advantageous embodiment, the at least one grip device can be at least connected with at least one end member at the corresponding end face of the hollow filter element. In this way, the at least one grip device can be combined in a space-saving way with the at least one end member.

By means of the at least one end member, the at least one grip device can be attached stably on the at least one filter bellows. In this way, a mechanical load on the filter bellows when gripping the hollow filter element can be reduced.

The at least one grip device can be detachably connected or destructively detachably connected to the at least one end member.

The at least one end member can advantageously be realized as a so-called end disk. End disks have a minimal axial expansion in relation to their radial expansion relative to the element axis.

The at least one end member can be connected seal-tightly, in particular air-tightly, with the filter bellows, in particular the filter medium.

Advantageously, the at least one end member can include plastic material, in particular polyurethane, or can consist of it. In this way, it can be produced and/or connected with the filter bellows, in particular the filter medium, in a simple way. The at least one end member can thus be connected also in a simple way with the at least one grip device.

Advantageously, the at least one end member can be at least partially elastic. In this way, it can compensate possible component-related and/or operation-related tolerances, in particular positional tolerances. Also, it can contribute in this way to damping particularly operation-caused vibrations and noises.

Advantageously, the functions of the at least one grip device and of the at least one end member can be individually optimized, respectively. Accordingly, the at least one grip device can be designed to be appropriately stable so that a good force transmission onto the filter bellows is possible. The at least one end member can be optimized in regard to the sealing action of the filter medium at the end face and/or to a tolerance compensation. Accordingly, the at least one end member can have at least one sealing function, in particular at least a sealing section, and/or at least one support element for sealing and/or supporting in particular relative to the filter housing.

The at least one end member and/or the at least one grip device can be connected, indirectly or directly, with the at least one filter bellows by means of an appropriate material-fusion and/or form-fit and/or frictional connection, in particular a positive fit connection, a plug connection, an adhesive connection, a weld connection, a soldered connection, a clamping connection, a locking connection, a rotary plug connection, in particular a screw connection and/or a bayonet-type connection, or the like or a combination of several connecting types. The materials and/or structures of the at least one end member and/or of the at least one grip device, on the one hand, and of the at least one filter bellows, on the other hand, can also mutually penetrate each other for providing a connection.

Advantageously, a fastening section of the at least one grip device, in particular by means of a rib structure, can project relative to the element axis at least radially into the at least one end member. In this way, a force transmission between the at least one grip device and the at least one end member can be improved.

Advantageously, the hollow filter element can be supported by means of the at least one end member on the filter housing.

The at least one grip device can advantageously be connected with the at least one end member such that it itself does not contact the filter housing, in particular does not support itself thereat. Alternatively or additionally, the at least one grip device can be supported at least partially on the filter housing.

Advantageously, the at least one filter bellows and/or possibly the at least one end member can project past the at least one grip device at least in its rest position, possibly the rest position of a grip element, in outward direction, i.e., toward the filter housing. The rest position can be assumed or adjusted particularly when the hollow filter element is arranged, ready for operation, in the filter housing and when the hollow filter element is in particular to be stored or packaged.

On the other hand, in a gripping position of the at least one grip device, the hollow filter element can be gripped by means of the at least one grip device for transport and for installation or removal. In the gripping position, at least one part of the at least one grip device, in particular a grip element, can project at least partially past the at least one filter bellows and/or possibly past the at least one end member. In this way, the at least one grip device can be more easily gripped. Alternatively, the at least one filter bellows and/or possibly the at least one end member can project past the at least one grip device.

Advantageously, the at least one grip device is connected or can be connected in a single-piece or in a multi-piece configuration with a central tube or support tube of the hollow filter element, at least for the purpose of producing the hollow filter element. The at least one grip device can be detachably connected or destructively detachably connected with the central tube or the support tube. The central tube or the support member can advantageously be extending in the element interior. It can be arranged advantageously coaxial to the element axis. It can be extending advantageously between the end faces, possibly between the end members provided thereat, of the hollow filter element.

Advantageously, at least one support element that provides a supporting action in particular axially relative to the element axis, in particular a support web, can be arranged at the at least one filter bellows, in particular the at least one end member.

Relative to the element axis, at least one support element can be arranged radially outside of the at least one grip device. In the installed state, the hollow filter element can be supported on the filter housing by means of the at least one support element.

Advantageously, several support elements can be distributed circumferentially relative to the element axis. In this way, a more uniform support action can be provided.

Advantageously, at least one support element can be at least partially elastic. In this way, tolerances, in particular positional tolerances and/or installation space tolerances and/or operation-caused tolerances, in particular between the hollow filter element and the filter housing, can be compensated better. Moreover, in this way operation-caused noises and/or vibrations can be dampened and compensated better.

Advantageously, at least one support element can be connected in a single-piece or multi-piece configuration with the at least one end member.

In a further advantageous embodiment, at least one part of the at least one grip device and/or at least one part of at least one end member can close off at least partially the element interior at the end face. In this way, the components that are present in any case can be used at least partially for closing off the element interior at the end face. A component expenditure and/or mounting expenditure can thus be reduced.

Advantageously, the at least one grip device alone or together with the at least one end member, or the at least one end member alone, can at least partially close off the element interior.

At least one part of the at least one grip device and at least one part of the at least one end member can supplement each other advantageously for closing off the element interior.

Advantageously, the at least one end member and/or the at least one grip device can stabilize the filter bellows at the end face.

Advantageously, the at least one end member can extend at least across the filter medium at the end face of the filter bellows. In this way, the at least one end member can be connected at the end face areally with the filter medium, in particular seal-tightly. Accordingly, the connection, in particular its mechanical stability, can be improved.

Advantageously, at least one part of the at least one grip device and/or at least one part of the at least one end member can extend at least across the element interior at the end face. In this way, the concerned part of the at least one grip device and/or of the at least one end member can at least partially close off the element interior at the end face.

Advantageously, the at least one grip device can extend at least across a portion of the filter bellows. In this way, a connection between the at least one grip device and the filter bellows and thus a force introduction from the at least one grip device into the filter bellows can be improved.

The at least one grip device and the at least one end member can overlap each other at least partially. In this way, a connection between the at least one grip device and the at least one end member can be improved.

Advantageously, the at least one end member can be realized in a material-saving way as an annular member. A central opening of the annular member can leave open the element interior in outward direction at the appropriate end face of the hollow filter element. The opening of the annular member can advantageously be closed off with an appropriate section, in particular cup section, of the at least one grip device. The at least one grip device and the at least one end member can supplement each other in this way and together close off the element interior at the corresponding end face of the hollow filter element.

In a further advantageous embodiment, the at least one grip device can include at least one grip element, in particular a handgrip, that is adjustable, in particular pivotable or foldable, relative to the at least one filter bellows and/or possibly relative to the at least one end member. In this way, the at least one grip element can be moved from the gripping position, in which it can be gripped for handling the hollow filter element, into a rest position. In the rest position, the grip element can thus be arranged easily in a space-saving way.

Advantageously, the at least one grip element can be pivotable or foldable. Accordingly, it can be simply pivoted or folded for changing the position.

Advantageously, the at least one grip element may include at least one handgrip. A hand grip can be easily gripped in particular by hand and/or by a gripping tool.

The handgrip can advantageously include at least one, preferably two, holding legs with which it is connected, indirectly or directly, with the filter bellows and/or possibly the at least one end member so as to be pivotable or foldable.

In a further advantageous embodiment, the at least one grip device can include at least one fixation element, in particular at least one fixation hook, for fixation of at least one adjustable grip element at least in a gripping position and/or a rest position. With the at least one fixation element the grip element can be secured in the corresponding position. In this way, it can be prevented that the at least one grip element is displaced in an uncontrolled fashion.

Advantageously, the at least one fixation element can be releasable. In this way, the at least one grip element can be moved easily out of the corresponding position or can be positioned into it. With the at least one fixation element, a fixation force can be realized which must be overcome for adjustment of the at least one grip element.

Advantageously, at least one fixation element can include at least one fixation hook. With the fixation hook, the at least one grip element can be hooked and/or locked in particular in a releasable way.

Advantageously, at least one fixation element can be positionally fixed relative to the at least one filter bellows and/or possibly the at least one end member. At least one fixation element can be interacting for fixation in the appropriate position with at least one appropriate locking receptacle, possibly a handgrip, provided on the at least one grip element, in particular can be hooked or locked.

Alternatively or additionally, at least one appropriate fixation element can be arranged on at least one grip element that can be hooked or locked with an appropriate locking receptacle associated with the at least one filter bellows and/or possibly the at least one end member.

In a further advantageous embodiment, at least one part of the at least one grip device, for example, the grip element, can be retracted at least in a rest position at least partially into the element interior and/or possibly within at least one end member. In this way, the outer dimension of the hollow filter element, at least in the rest position of the at least one grip device, can be reduced. Accordingly, the element interior and/or possibly the at least one end member can be utilized in order to at least partially accommodate the at least one grip device. It is especially preferred that the part of the at least one grip device in a rest position is completely retracted within the element interior and/or within the at least one end member. In this context, the retracted part of the grip device, for example, the grip element, and preferably the entire grip device in the retracted state does not project past the axial end face of the end member (e.g. of an end disk).

In a further advantageous embodiment, the at least one grip device can include at least one holding member, in particular a holding cup, with which at least one grip element can be adjustably connected. The at least one grip device can be indirectly or directly secured on the at least one filter bellows and/or possibly on the at least one end member by means of the at least one holding member.

The at least one holding member can be designed such that it realizes a connection, as areal as possible, with the at least one filter bellows indirectly or directly, possibly by means of an end member. In this way, a more stable connection and a more uniform force transmission can be achieved.

Advantageously, the at least one holding member can be encompassed of a holding cup. At least one grip element can be retracted in its rest position in a space-saving way and in particular completely in an appropriate recess of the holding cup.

The at least one grip device, in particular the at least one holding cup, in particular its recess, can advantageously project at least partially into the element interior. In this way, the outer dimension, in particular the axial expansion, of the hollow filter element can be reduced.

The at least one holding member can advantageously be pre-manufactured together with the at least one grip element. In this way, the at least one grip device can be connected as a pre-mounted component with the at least one filter bellows and/or possibly the at least one end member. The at least one grip device can be realized as grip module. Depending on the utilization purpose, in particular depending on dimensions, in particular shape and/or size, of the hollow filter element, different holding members can be combined as needed with different grip elements.

Advantageously, the at least one holding member and the at least one grip element can be separate parts. They can be also realized as a contiguous, in particular integrated, component.

The at least one grip element and the at least one holding member can be made of the same or of different materials or material mixtures or can include them.

In a further advantageous embodiment, the at least one grip element can include at least one grip connecting element, in particular a locking projection and/or a locking receptacle, of an in particular detachable quick-connect device, in particular a locking connection, snap-on connection, clamping connection and/or plug connection, that can be connected, in particular movably, with at least one appropriate connecting element, in particular a holding member connecting element, in particular a locking receptacle and/or a locking projection that can be arranged on the at least one filter bellows and/or possibly on at least one end member and/or possibly on at least one holding member. With a quick-connect device, the at least one grip element can be simply and stably connected with the at least one filter bellows and/or possibly the at least one end member and/or possibly the at least one holding member.

Advantageously, the quick-connect device can be released in a non-destructive way. In this way, the at least one grip element can be removed, if needed.

Advantageously, the at least one filter bellows and/or possibly the at least one end member and/or possibly the at least one holding member can include at least one holding tab which includes the at least one holding member connecting element.

Advantageously, at least two holding tabs can be provided between which the at least one grip element, in particular a handgrip, in particular at least one holding leg of the handgrip, can be movably, in particular pivotably, secured, in particular clamped.

In a further advantageous embodiment, at least one connection, in particular a quick-connect device, between at least one grip element of the at least one grip device and the at least one filter bellows and/or possibly at least one end member and/or possibly at least one holding member of the at least one grip device can include at least one mounting aid, in particular at least one guide surface and/or at least one guide element, for guiding at least one connecting element of one of the components to be connected, in particular a grip connecting element of the at least one grip element, for connection with an appropriate connecting element, in particular a holding member connecting element, of the appropriate other component, in particular associated with the at least one filter bellows and/or possibly the at least one end member and/or possibly the at least one holding member. By means of the at least one mounting aid, the at least one connecting element associated with the grip element and the at least one connecting element associated with the filter bellows and/or possibly the end member and/or possibly the holding member can be joined in a simpler and more precise way.

Advantageously, at least one guide surface, in particular a guide ramp and/or guide groove and/or slope can be provided that is associated with at least one connecting element, in particular associated with at least one holding tab, in particular associated with the filter bellows and/or possibly the at least one end member and/or possibly the at least one holding member. The at least one guide surface can advantageously extend to the at least one appropriate connecting element, in particular at least one holding member connecting element, in particular a locking receptacle.

Advantageously, at least one connecting element, in particular a locking projection, can be slanted downwardly like a wedge on a side which is facing the appropriate other connecting element during assembly, in particular a locking receptacle. In this way, the connecting elements can better glide across each other and be guided toward each other.

Advantageously, at least one of the components to be connected, possibly the at least one holding member, in particular possibly at least one holding tab of the at least one holding member, and/or the at least one grip element, can include at least one guide groove for guiding at least one locking element, in particular a locking projection, of the appropriate other component to be connected, in particular of at least one grip element and/or holding member.

In a further advantageous embodiment, the at least one grip device, in particular a holding member of the grip device, can be integrated, in particular embedded, at least partially in the at least one end member and/or at least partially can be formed by the at least one end member, or vice versa. In this way, a stable and/or space-saving connection between the at least one grip device and the at least one end member can be realized.

Advantageously, at least one grip device, possibly at least one holding member of the grip device, can be embedded at least partially by foaming, by casting, or injection molding into the material of the at least one end member.

Advantageously, the at least one holding member can be embedded by foaming in polyurethane for realizing the at least one end member.

Advantageously, the at least one grip device, possibly the at least one holding member, can include a rib structure. When injection-molded, embedded, cast or embedded by foaming, the material of the at least one end member can better penetrate the rib structure and in this way can improve the connection to the at least one grip device.

The at least one grip device can be connected also in a different way, in particular by friction and/or form fit and/or material fusion, with the at least one end member.

Advantageously, the at least one end member can at least partially form the at least one grip device, possibly the holding member. Alternatively, the at least one grip device can at least partially form at least one end member.

The technical object is further solved for the grip device in accordance with the invention in that the grip device can be arranged at an end face of the hollow filter element that is not provided for passage of air in operation of the hollow filter element.

The technical object is further solved for the filter device according to the invention in that the at least one grip device is arranged on an end face of the hollow filter element that is not provided for passage of air in operation of the hollow filter element.

In other respects, the features and advantages that have been disclosed in connection with the hollow filter element according to the invention, the grip device according to the invention, and the filter device according to the invention and their respective advantageous embodiments apply likewise among each other and vice versa. The individual features and advantages can, of course, be combined with each other wherein further advantageous effects may result that exceed the sum of the individual effects.

BRIEF DESCRIPTION OF THE DRAWINGS

Further advantages, features, and details of the invention result from the following description in which an embodiment of the invention will be explained in more detail with the aid of the drawing. A person of skill in the art will consider the features disclosed in the drawing, the description, and the claims in combination also individually and combine them to other meaningful combinations.

FIG. 3 shows the air filter of FIGS. 1 and 2 without housing cover, wherein a handgrip of the grip device is illustrated in its folded-in rest position.

FIG. 4 shows the open air filter of FIG. 3 with handgrip folded out.

FIG. 7 shows the round filter element of FIG. 6 with handgrip folded in.

FIG. 8 is a detail view of the grip device of the round filter element of FIGS. 1 to 7 with handgrip folded out.

FIG. 9 shows the grip device of FIG. 8 with handgrip folded in.

FIG. 10 shows a holding cup of the grip device of FIGS. 8 and 9 without handgrip.

FIG. 11 shows the handgrip of the grip device of FIGS. 8 and 9 without holding cup.

In the Figures, same components are provided with same reference characters.

DESCRIPTION OF THE INVENTION

Figures 1, 2:
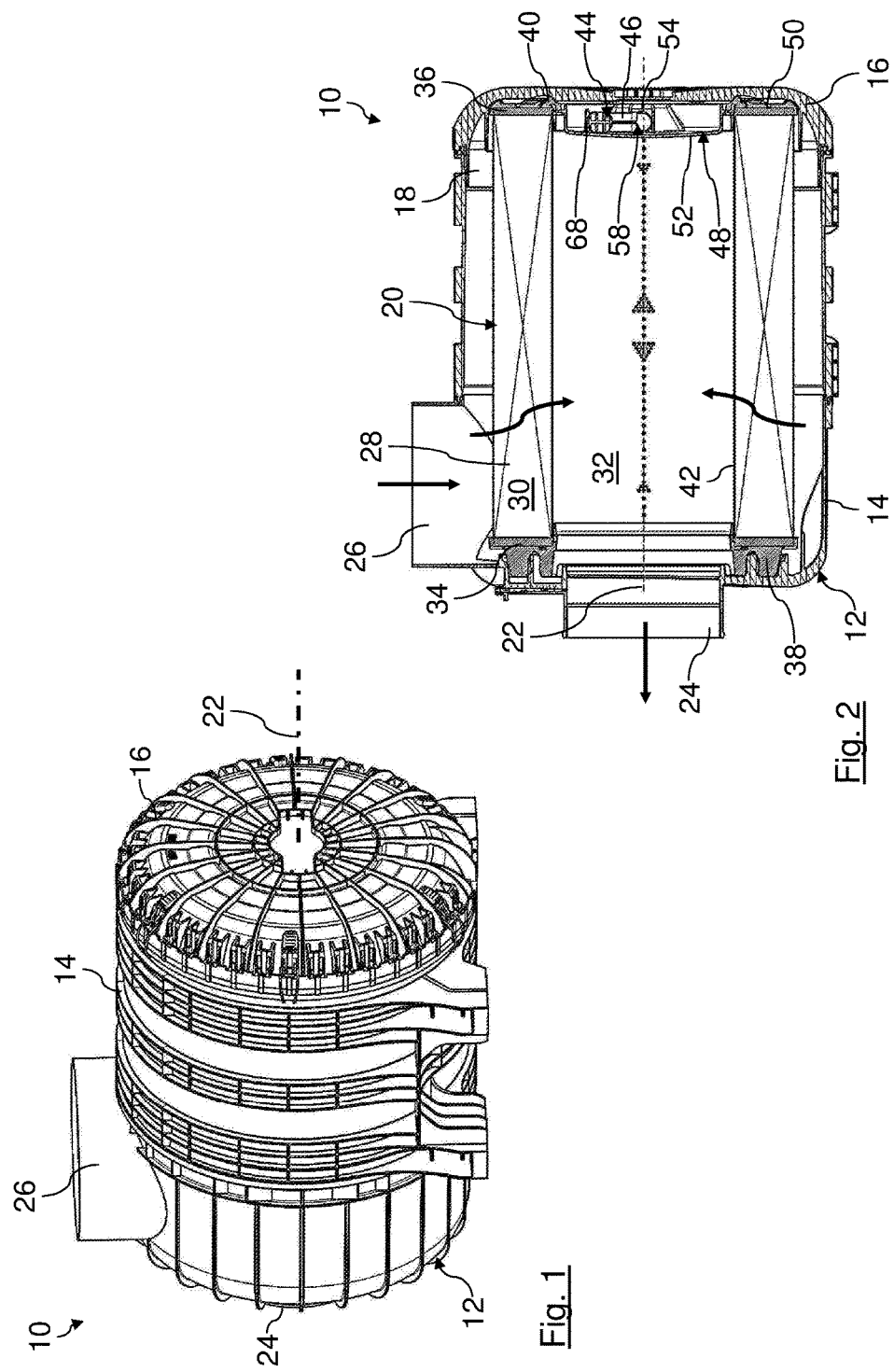
FIG. 1 shows an isometric illustration of an air filter of an internal combustion engine of a construction vehicle, including a filter housing in which a round filter element is arranged which includes a grip device for transport and installation and removal.
FIG. 2 shows a longitudinal section view of the air filter of FIG. 1 along an element axis of the round filter element.

In FIG. 1, an air filter 10 of an internal combustion engine of a commercial machine, for example, a construction vehicle, is shown in isometric illustration. FIG. 2 shows the air filter 10 in a longitudinal section view. The air filter 10 is arranged in an intake manifold of the internal combustion engine and serves for purification of the air required for combustion.

Figure 5:
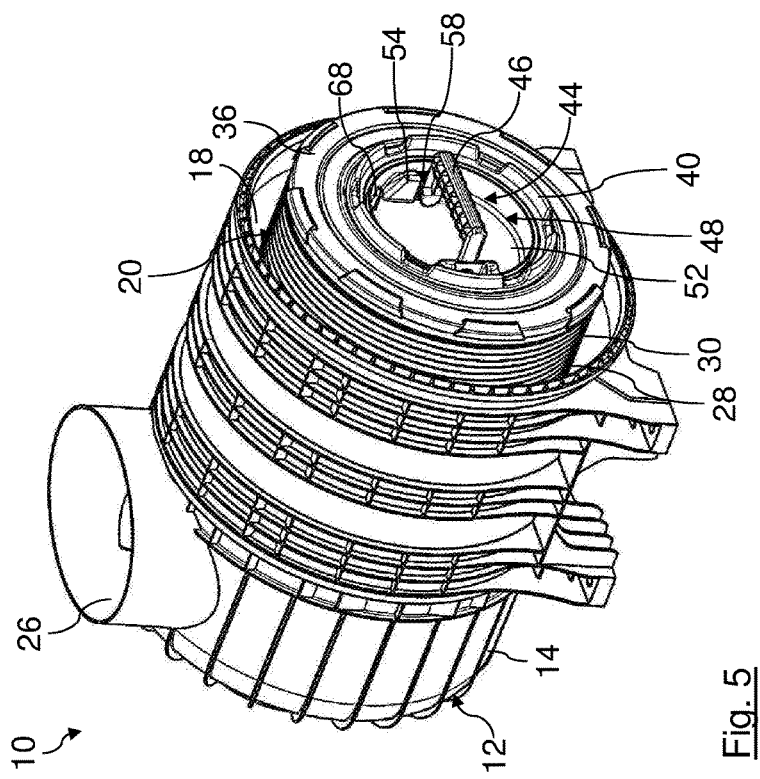
FIG. 5 shows the open air filter of FIG. 4 in another perspective view.

The air filter 10 includes a filter housing 12. The filter housing 12 is made of a housing cup 14 and a housing cover 16 and is openable. The housing cover 16 closes off an installation opening 18 of the filter housing 12 for installation of a filter element 20. The installation opening 18 is, for example, easily visible in FIGS. 3 to 5. Here, the air filter 10 is illustrated without housing cover 16.

The air filter 10 as a whole is coaxial to an axis 22 which is indicated in FIGS. 1, 2, 8, and 9. When in the following "axial", "coaxial", "radial", "circumferential" or the like is mentioned, this relates to the axis 22, if nothing to the contrary is mentioned. In the present embodiment, the axis 22 coincides with a housing axis of the filter housing 12, an element axis of the filter element 20, and an installation axis. For ease of understanding, the afore mentioned axes in the following are referred to for short as axis 22. Axial to the installation axis, i.e., axis 22, the filter element 20 can be installed in the housing cup 14 and removed therefrom. Axial to the installation axis, the housing cover 16 can be mounted on the installation opening 18 of the housing cup 14. The installation opening 18 is coaxial to the axis 22. As a whole, the filter housing 12 is approximately of a circular cylindrical coaxial shape.

At the end face which is axially opposite the installation opening 18, the housing cup 14 has a coaxial air outlet 24 for purified air. Near the air outlet-associated end face, an air inlet 26 for air to be purified extends into the housing cup 14 on its circumferential side. The filter element 20 is arranged in the filter housing 12 such that it separates the air inlet 26 from the air outlet 24.

The housing cover 16 is detachably connected by clamps, not of interest in this context, with the housing cup 14 and closes off the installation opening 18 in a seal-tight manner.

The filter element 20 is designed as a so-called round filter element. In the illustrated embodiment, an outer diameter of the filter element 20 amounts to approximately 40 cm, for example. In other embodiments according to the invention, the outer diameter can also be significantly smaller or greater. The filter element 20 includes a coaxial filter bellows 28 of a zigzag-shaped folded circumferentially closed filter medium 30, for example, filter paper. The filter bellows 28 is approximately circular cylindrical. The filter medium 30 surrounds a coaxial element interior 32 circumferentially. The radial diameter of the element interior 32 is somewhat larger than the diameter of the air outlet 24.

At its end face which is facing the air outlet 24, the filter bellows 28 is seal-tightly connected to a coaxial ring-shaped outlet-associated end disk 34. At the opposite end face, which with installed filter element 20 is facing the housing cover 16, the filter bellows 28 is seal-tightly connected with a coaxial ring-shaped cover-associated end disk 36.

The end disks 34 and 36 include in the area of the end face-associated ends of the element interior 32 a coaxial opening, respectively. The end disks 34 and 36 each are made of polyurethane foam seal-tightly foamed onto the end faces of the filter bellows 28.

The outlet-associated end disk 34 includes at its exterior side which is facing the air outlet 24 a coaxial ring-shaped circumferentially continuous sealing section 38. The sealing section 38 circumferentially surrounds the coaxial opening of the outlet-associated end disk 34 and, in the installed state, the air outlet 24. The sealing section 38 seals relative to the bottom of the housing cup 14. The sealing section 38 separates a raw air side surrounding the filter element 20 which is connected with the air inlet 26 from a clean air side associated with the element interior 32 and with the air outlet 24.

The cover-associated end disk 36 includes on its exterior side which is facing axially away from the element interior 32 a plurality of web-shaped support sections 40 which can be easily seen in FIGS. 3 to 7, for example. The support sections 40 are located in the area of the radial inner circumferential side of the cover-associated end disk 36 and respectively extend each in circumferential direction and in axial direction away from the element interior 32. With the support sections 40, the filter element 20 is supported in axial direction against the inner side of the housing cover 16.

The end disks 34 and 36, inclusive the sealing section 38 and the support sections 40, are elastic.

Between the end disks 34 and 36, a coaxial support tube 42 is extending in the element interior 32. The circumferential wall of the support tube 42 is lattice-shaped and permeable for air. The end faces of the support tube 42 are open. The radial inner circumferential side of the filter bellows 28, i.e., radial inner fold edges of the filter medium 30, can be supported on the radial outer circumferential side of the support tube 42. The ends of the support tube 42 are embedded in the polyurethane of the associated end disk 34 and 36, respectively.

The filter element 20 includes a grip device 44 on its cover-associated end face. The filter element 20 can be gripped and handled by means of the grip device 44 by hand and/or by a gripping tool for installation, removal, and transport. The grip device 44 is illustrated in detail in the FIGS. 8 to 11.

The grip device 44 includes a handgrip 46 that is attached pivotably on a holding cup 48. The holding cup 48 and the handgrip 46 are made of plastic material, respectively.

The handgrip 46 can be pivoted for gripping into a gripping position, as it is shown in FIGS. 4 to 6 and 8. In the gripping position, the handgrip 46 projects past the cover-associated end disk 36 in axial direction. From the gripping position, the handgrip 46 can be pivoted into a rest position that is illustrated in FIGS. 2, 3, 7, and 9.

The holding cup 48 is illustrated in detail in FIG. 10. It is configured as a whole approximately coaxial to the axis 22. It includes radial outwardly a coaxial annular fastening section 50. The fastening section 50 extends circumferentially and approximately radially. The fastening section 50 is of a rib-like design. The fastening section 50, as illustrated in FIG. 2, is embedded in the cover-associated end disk 36. Its ribs are penetrated by the polyurethane of the cover-associated end disk 36. The holding cup 48 and thus the grip device 44 are thus connected fixedly with the cover-associated end disk 36

Radially inwardly, the fastening section 50 passes into an approximately cup-shaped cup section 52 having an axially extending ring-shaped tubular circumferential wall 55 closed on an axial end by a bottom wall 53. The bottom 53 of the cup section 52, as shown in FIGS. 2 and 10, for example, is facing the element interior 32. The cup section 52 projects in axial direction through the cover-associated end disk 36 somewhat into the element interior 32. On the exterior side which is axially facing away from the element interior 32, the holding cup 48 is flush with the axial exterior side of the cover-associated end disk 36. The cup section 52 closes off the end face-associated coaxial opening of the filter bellows 28 so that the filter element 20 is closed at the cover-associated end face of the element interior 32.

In the interior of the cup section 52, on the exterior side which is axially facing away from the element interior 32, the two holding tabs 54 for holding the handgrip 46 are arranged. The holding tabs 54 are connected monolithically with the bottom and the circumferential wall of the cup section 52. The holding tabs 54 each extend axially away from the bottom of the cup section 52. They are located on radial opposite sides of the cup section 52.

Each holding tab 54 includes a locking receptacle 56 of a releasable locking device 58 with which the handgrip 46 is connected with the holding cup 48. The locking receptacles 56 are realized as round through holes, respectively. They are coaxial to a pivot axis 60 of the grip device 44, which is indicated in FIGS. 8 to 11 and extends perpendicular to the axis 22 so as to cross it. The handgrip 46 can be pivoted about the pivot axis 60 relative to the holding cup 48.

At their sides facing each other, the holding tabs 54 each include a guide groove 62 for corresponding locking noses 64 of the handgrip 46. The guide grooves 62 extend in axial direction relative to the axis 22, respectively. They are open at their facing sides. The bottoms of the guide grooves 62 form bottom guide surfaces, respectively. On their sides facing axially away from the bottom of the cup section 52, the bottom guide surfaces of the guide grooves 62 are slanted radially outwardly relative to the axis 22. In this way, an installation of the locking noses 64 of the handgrip 46 can be simplified. The locking receptacles 56 each penetrate the bottoms of the guide grooves 62, i.e., the bottom guide surfaces. The locking receptacles 56 are located within the guide grooves 62, i.e., the bottom guide surfaces.

When assembling the locking device 58, the locking noses 64 can be moved by the guide grooves 62 toward the corresponding locking receptacles 56 and can lock therein.

On their exterior sides facing radially away, each locking tab 54 has a recess 66. The recesses 66 are open at their sides that are facing away axially from the bottom of the cup section 52 relative to the axis 22. For example, a tool can be inserted into the recess 66 in axial direction in order to push the locking noses 64 radially inwardly out of the locking recesses 56 so that the handgrip 46 can be removed.

Moreover, the grip device 44 includes two spring-elastic fixation hooks 68 which, at the inner side of the cup section 52, are connected monolithically with its bottom. By means of the fixation hooks 68, the handgrip 46 can be secured in its rest position. In the rest position, the handgrip 46 is completely recessed within the cup section 52. The fixation hooks 68 each extend axially away from the bottom of the cup section 52. They are located within a projection of the sides of the locking tabs 54 that are facing each other in the vicinity of the circumferential side of the cup section 52.

At their ends, the fixation hooks 68 each include a wedge-shaped locking section 70. The locking sections 70 are facing the pivot axis 60. By means of the locking sections 70, the fixation hooks 68 can hook behind a grip section 72 of the handgrip 46 in the rest position. For hooking and releasing, the fixation hooks 68 can be bent in a springy fashion away from the pivot axis 60, respectively.

The handgrip 46 as a whole is approximately U-shaped. It includes two parallel extending holding legs 74 which each are monolithically joined with one end of the grip section 72. The grip section 72 extends approximately parallel to the pivot axis 60. The holding legs 74 extend approximately perpendicular to the grip section 72. The grip section 72 and the holding legs 74 each are provided with reinforcement ribs. The length of the holding legs 74 is dimensioned such that the grip section 72 projects out of the holding cup 48 in the gripping position of the handgrip 46 and the handgrip 46 fits into the cup section 52 in the rest position. The length of the holding legs 74 plus the corresponding height extension due to the holding tabs 54 is greater than an axial height of the cup section 52. The length of the holding legs 74, measured relative the pivot axis 60, is significantly smaller than a radius of the cup section 52.

At the free ends, each holding leg 74 is provided with a locking nose 64. The locking noses 64 each include an approximately circular envelope which is coaxial to the pivot axis 60. The diameter of the envelope corresponds to an inner diameter of the locking receptacles 56 of the holding tab 54. The locking noses 64 each extend in axial direction relative to the pivot axis 60.

The outer sides of the locking noses 64, which relative to the pivot axis 60 are positioned axially outwardly, form respective guiding surfaces. Viewed from the ends of the holding legs 74 perpendicular to the pivot axis 60 toward the grip section 72, the locking noses 64 increase in height in a wedge shape relative to the pivot axis 60 in axial outward direction. Due to the slantedly extending guiding surfaces of the locking noses 64, a guiding action in the guide grooves 62 of the securing tabs 54 can be improved.

The guiding surfaces each are formed by an approximately disk-shaped material section of the locking noses 64 which is joined by means of connecting webs monolithically with the respective holding leg 74. The locking noses 64, in particular the guiding surfaces, are elastically moveable as a whole axially relative to the pivot axis 60, i.e., radially to the axis 22.

For producing the filter element 29, the filter bellows 28 is manufactured from the filter material 30. The handgrip 46, the holding cup 48, and the support tube 42 each are manufactured of plastic material as separate component parts.

With its holding legs 74 leading, the handgrip 46 is inserted between the securing tabs 54 of the holding cup 48. In this context, the locking noses 64 are guided in the respective guide grooves 62. During insertion, the locking noses 64, i.e., the guiding surfaces, are elastically bent toward each other relative to the pivot axis 60 in axial direction due to the corresponding guiding grooves 62. As soon as the locking noses 64 have reached the corresponding locking recesses 56, they lock therein. The handgrip 46, instead of being pre-manufactured together with the holding cup 48, can also be connected therewith at a later point in time.

The support tube 42 is inserted into the element interior 32 of the filter bellows 28. The grip device 44 is pushed, with its side facing away from the handgrip 46 leading, onto an end face of the filter bellows 28. In this context, the cup section 52 is inserted somewhat into the end of the support tube 42 and clamped therein.

Subsequently, polyurethane for realizing the cover-associated end disk 36 is foamed onto the end face of the filter bellows 28. In this context, the ribs of the fastening section 50 of the holding cup 48 are embedded by foaming. Also, the outlet-associated end disk 34 is correspondingly produced by foaming from polyurethane on the end face of the filter bellows 28.

The outlet-associated end disk 34 can also be realized together with the cover-associated end disk 36 or before it. It is also possible to realize first the outlet-associated end disk 34 and to subsequently mount the grip device 44 and embed it by foaming with the cover-associated end disk 36.

Figure 6:
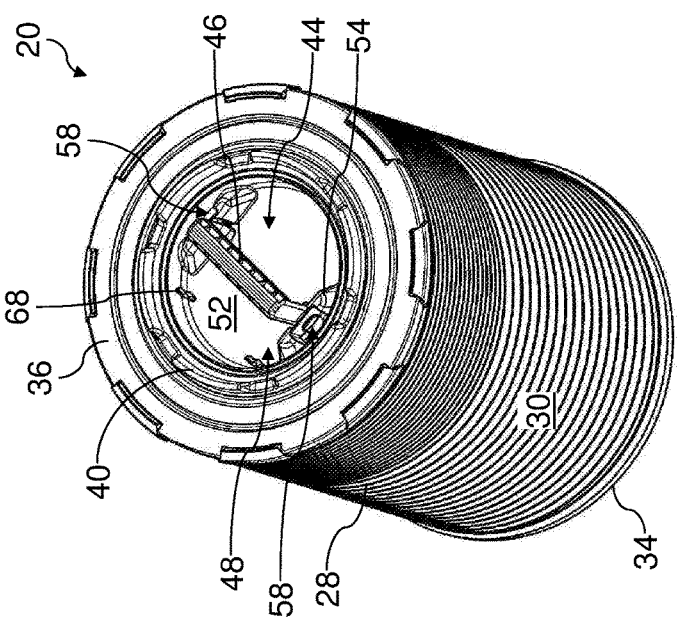
FIG. 6 is an isometric detail illustration of the round filter element of the air filter of the FIGS. 1 through 5 with handgrip folded out.

For transport and handling of the finished filter element 20, the handgrip 46, as shown in FIG. 6, can be pivoted into its gripping position. The filter element 20 can thus be easily carried. For storage or packaging, the handgrip 46 can be pivoted into its rest position, shown in FIG. 7.

For installation into the open filter housing 12, the handgrip 46 is pivoted into its gripping position. The filter element 20 is then inserted axially relative to the axis 22, with the outlet-associated end disk 34 leading, through the installation opening 18 into the housing cup 14.

Subsequently, the handgrip 46 is pivoted into its rest position as is shown in FIG. 3. The fixation hooks 68 lock in this context behind the grip section 72 of the handgrip 46 and secure it in the rest position.

Subsequently, the housing cover 16 is mounted axially relative to the axis 22 on the installation opening 18 of the housing cup 14 and secured by means of clamps.

In the installed state, the filter element 20 is supported by means of the support sections 40 on the housing cover 16. The handgrip 46 is recessed in the cup section 52 and does not project therefore in axial direction out of the filter element 20. In this embodiment, the filter element 20 is not supported with the grip device 44 on the housing cover 16. At the outlet side, the filter element 20 is supported in axial direction by means of the sealing section 38 on the bottom of the housing cup 14.

For exchanging the filter element 20, the housing cover 16 is removed accordingly. The handgrip 46 is pivoted into its gripping position. The filter element 20 can now be gripped by means of the handgrip 46 and can be pulled axially out of the housing cup 14. The exemplified filter element 20 can have, when laden with dirt, a mass of up to 30 kg and more.

In operation of the internal combustion engine, the ambient air to be purified flows through an air inlet line, not illustrated, and the air inlet 26 into an annular inlet space of the filter housing 12 that surrounds the filter element 20. The air flows through the filter medium 30 in radial direction from the exterior to the interior and is purified. The purified air flows through the circumferential wall of the support tube 42 into the element interior 32. From the element interior 32, the purified air flows through the coaxial opening of the outlet-associated end disk 34 into the air outlet 24 and exits therethrough from the air filter 10. The purified air is supplied by an air conduit, not illustrated and connected with the air outlet 24, to the internal combustion engine.

While specific embodiments of the invention have been shown and described in detail to illustrate the inventive principles, it will be understood that the invention may be embodied otherwise without departing from such principles.

What is claimed is:

1. A hollow filter element of a filter device for filtering air, wherein
the hollow filter element is configured to be arranged exchangeably in a filter housing of the filter device so that at least one air inlet of the filter housing for air to be filtered is separated from at least one air outlet of the filter housing for filtered air;
the hollow filter element comprising:
at least one filter bellows including at least one filter medium surrounding circumferentially at least one element interior relative to an element axis of the hollow filter element;
a ring-shaped annular end disk seal-tightly connected to filter medium at an axial end face of the at least one filter bellows, the ring-shaped annular end disk having a central through-opening;
a grip device, comprising:
a holding cup comprising:
a recessed cup section comprising:
a ring-shaped tubular circumferential wall arranged in the central through-opening of the ring-shaped annular end disk, the ring-shaped circumferential wall projecting axially into the element interior in a radial interior of the filter medium;
a bottom wall arranged on and closing a first axial end of the ring-shaped tubular circumferential wall, the bottom wall arranged in the element interior within the radial interior of the filter medium;
a fastening member formed on a second axial end of the ring-shaped tubular circumferential wall, the fastening member projecting radially outwardly away from the ring-shaped tubular circumferential wall;
wherein the fastening member is embedded into material forming the ring-shaped annular end disk, securing the grip device to the ring-shaped annular end disk;
a hand grip rotatably fastened to an interior of the holding cup, the hand grip adjustable:
from a rest position where the hand grip is arranged within the interior of the holding cup;
to a grip position where the hand grip is rotated axially outwardly away from the disc-shaped bottom wall such that the hollow filter element can be gripped by the hand grip at least for installation into or removal from the filter housing.

2. The hollow filter element according to claim 1, wherein at least a part of the grip device closes off the element interior.

3. The hollow filter element according to claim 1, wherein the grip device comprises at least one releasable locking device arranged on the ring-shaped tubular circumferential wall or the bottom wall of the grip device, the at least one releasable locking device releasably locking the hand grip in the rest position in the interior of the holding cup.

4. The hollow filter element according to claim 3, wherein the hand grip comprises:
a grip section configured to be gripped by a hand;
at least one holding leg having a first end secured to and projecting outwardly from the grip section;
a locking nose formed on a second end of the at least one holding leg;
wherein the locking nose has a slanted guiding surface;
wherein the holding cup comprises:
at least one holding member arranged on ring-shaped tubular circumferential wall or the bottom wall of the holding cup, the at least one holding member rotatable fastening the hand grip to the holding cup;
wherein the at least one holding member has a locking receptacle receiving the locking nose for rotatably mounting the hand grip.

5. The hollow filter element according to claim 4, wherein the locking nose of the least one holding leg has a slanted guiding surface which contacts the at least one holding member during installation of the hand grip, the slanted guiding surface enabling a quick connection of the hand grip into the locking receptacle of the at least one holding member.

6. The hollow filter element according to claim 1, wherein in the rest position, the hand grip is arranged within and recessed within the interior of the holding cup.

7. The hollow filter element according to claim 1, wherein the hand grip comprises
at least one grip connecting element,
wherein at least one corresponding connecting element is arranged on the ring-shaped tubular circumferential wall or on the bottom wall of the holding cup
wherein the at least one grip connecting element and the at least one corresponding connecting element are moveably connected to each other and form a releasable quick-connect device.

8. The hollow filter element according to claim 7, wherein the at least one grip connecting element is a locking projection or a locking receptacle and wherein the at least one corresponding connecting element is a locking receptacle matching the locking projection of the at least one grip element or a locking projection matching the locking receptacle of the at least one grip element.

9. The hollow filter element according to claim 7, wherein the releasable quick-connect device is a locking connection; a snap-on connection; a clamping connection; or a plug connection.

10. The hollow filter element according to claim 1, wherein
the fastening member of the holding cup is a fastening ring circumferentially surrounding the ring-shaped tubular circumferential wall of the holding cup;
wherein the fastening member includes a plurality of radially extending ribs, the ribs spaced circumferentially apart to receive material of the ring-shaped annular end disk there between.

11. A filter device for filtration of air, the filter device comprising:
a filter housing including at least one air inlet for air to be filtered and at least one air outlet for filtered air;
at least one hollow filter element according to claim 1 exchangeably arranged in the filter housing such that the at least one hollow filter element separates the at least one air inlet from the at least one air outlet.

12. A grip device of a hollow filter element of a filter device for filtering air, wherein
the hollow filter element is configured to be arranged exchangeably in a filter housing of the filter device so that at least one air inlet of the filter housing for air to be filtered is separated from at least one air outlet of the filter housing for filtered air,
wherein the hollow filter element includes at least one filter bellows comprising at least one filter medium surrounding circumferentially at least one element interior relative to an element axis of the hollow filter element,
wherein the grip device is configured such that the hollow filter element can be gripped by the grip device at least for installation of the hollow filter element into or removal of the hollow filter element from the filter housing,
wherein the grip device is configured to be arranged at an end face of the at least one filter bellows that is not provided for passage of air in operation of the hollow filter element,
wherein the grip device, comprises:
a holding cup comprising:
a recessed cup section comprising:
a ring-shaped tubular circumferential wall;
a bottom wall arranged on and closing a first axial end of the ring-shaped tubular circumferential wall;
a fastening member formed on a second axial end of the ring-shaped tubular circumferential wall, the fastening member projecting radially outwardly away from the ring-shaped tubular circumferential wall,
wherein the fastening member is configured to be embedded into material forming a ring-shaped annular end disk of the hollow filter element;
a hand grip rotatably fastened to an interior of the holding cup, the hand grip adjustable:
from a rest position where the hand grip is arranged within the interior of the holding cup;
to a grip position where the hand grip is rotated axially outwardly away from the disc-shaped bottom wall such that the hollow filter element can be gripped by the hand grip at least for installation into or removal from the filter housing.

13. The grip device according to claim 12, wherein
the fastening member of the holding cup is fastening ring circumferentially surrounding the ring-shaped tubular circumferential wall of the holding cup;
wherein the fastening member includes a plurality of radially extending ribs, the ribs spaced circumferentially apart to receive material of the ring-shaped annular end disk there between.

* * * * *